United States Patent Office 2,861,062
Patented Nov. 18, 1958

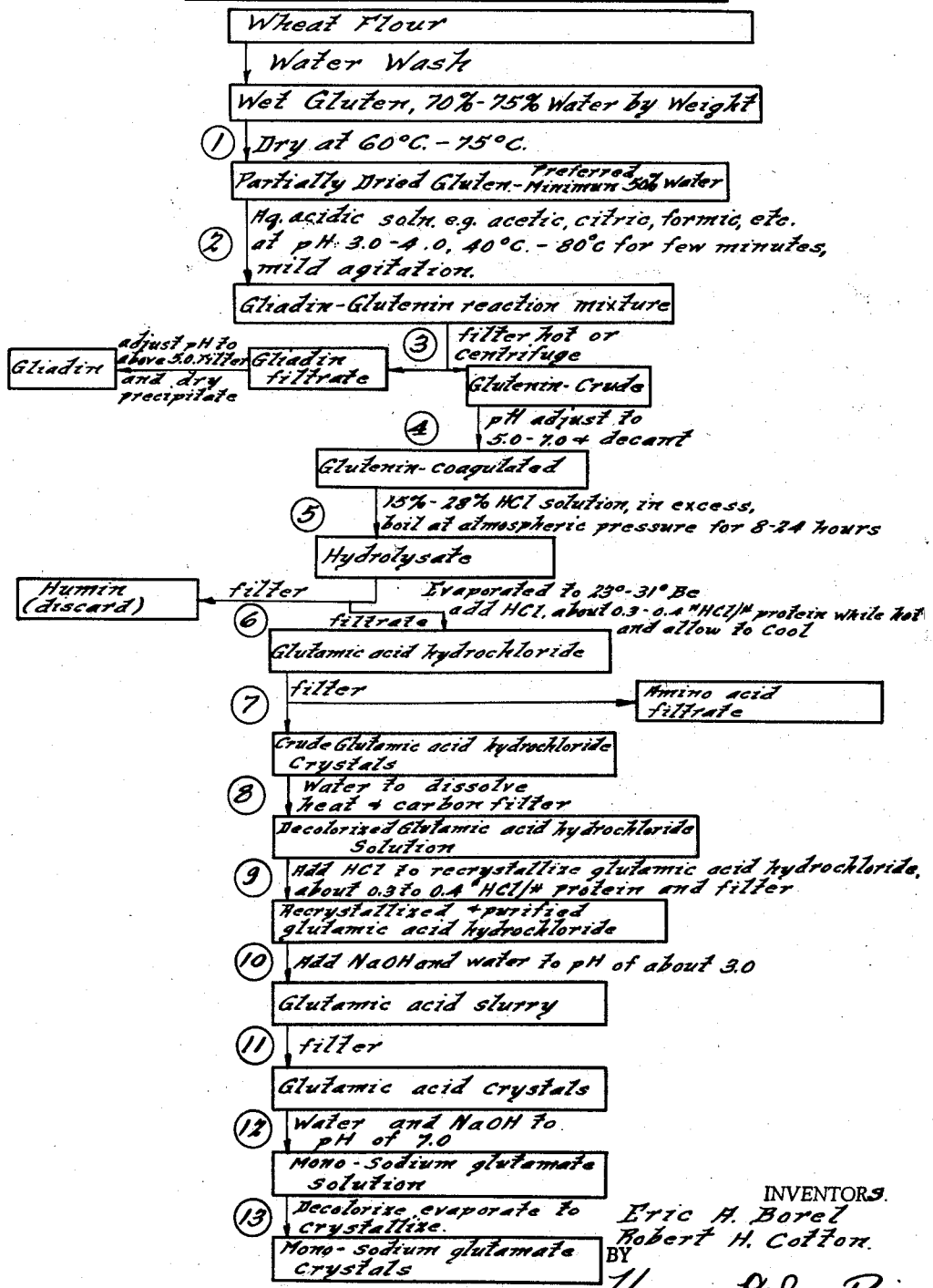

2,861,062

METHOD OF TREATING GLUTEN TO PRODUCE GLIADIN AND GLUTAMATES THEREFROM

Eric A. Borel and Robert H. Cotton, Wilmington, Del., assignors to Hercules Powder Company, Wilmington, Del., a corporation of Delaware Application May 13, 1957, Serial No. 658,790

6 Claims. (Cl. 260—123)

The present invention relates to an improved method for treating gluten to produce gliadin and monosodium glutamate therefrom. The method of this invention is the type which reacts gluten with an acid at elevated temperature, thereafter precipitates gliadin from the reaction solution and then separates the gliadin precipitate. Heretofore this general process has been employed with a variety of acids and with gluten in dry and wet forms. The use of gluten in dry form has the disadvantage that the drying operation raises the cost of the raw material appreciably. Wet gluten, while desirable from certain standpoints, does not yield the highest efficiency with respect to gliadin production. In our copending application Serial No. 624,491, filed November 27, 1956, a process starting with wet gluten to produce gliadin and vital and useful glutenin is described and claimed. The present invention is based on the discovery that the efficiency of the gliadin separation from gluten is improved, relative to undried or wet gluten, when the gluten is preliminarily partially dried or heat conditioned and preferably to a controlled moisture content gluten. Moreover it has been found that the residue from the gliadin separation step when using such partially dried gluten as the starting material is an excellent starting material for the manufacture of monosodium glutamate and that this process accomplishes more efficient utilization of the protein content of the starting material than any heretofore known process.

Wet gluten which is suitable for preliminary heat conditioning or partial drying in accordance with this invention is any gluten which is gliadin-rich or which contains a substantial proportion of gliadin such as gluten obtained from wheat. Wet gluten obtained from the washing of wheat flour normally contains about 70% by weight of water, but the water content may range as low as about 65% or as high as 75% or above in extreme cases.

The process of this invention is set forth in flow sheet form in Figure 1 and will be described in detail in connection with that figure. In step 1, wet gluten is heat conditioned or partially dried by raising the temperature thereof between about 60° C. and about 75° C. Preferably this heating is continued for a period of time sufficient to reduce the moisture content in the gluten to a minimum of about 50% by weight, with even better results being obtained when there is a minimum of 60% by weight of moisture. After such heat conditioning the gluten is sticky and somewhat shiny. A decrease in the efficiency of the gliadin recovery occurs if the moisture content is reduced appreciably below 50% by weight, and this is believed to be due to the fact that lower moisture contents convert the gluten into a form that has less hydration capacity, and upon reaction with an aqueous acidic solution the separation of glutenin and gliadin is rendered more difficult. Under the preferred conditions the moisture content is reduced by heating to about 60% by weight, that is between about 63% to 60%, and at this degree of moisture content the hydration capacity of the gluten remains almost the same as the unheated gluten. The method of applying the heat to the wet gluten is unimportant so long as the temperature in the gluten per se does not exceed about 75° C. The gluten may be heated in an oven by infra-red rays, positioned on a heated roll, etc. When the temperature exceeds about 75° C. subsequent reaction of the heated gluten with acidic solutions will not cause an appreciable separation of gliadin from the glutenin portion of the gluten. Although it is not known for certain, it is believed that the heat conditioning, as above defined, serves to devitalize only the glutenin portion of the gluten so that subsequent contact with an aqueous acidic solution causes the separation of gliadin and glutenin.

The gluten in its heat conditioned or partially dried form is then ready for reaction with an aqueous acidic solution. A large number of acids are satisfactory for use in the reaction with this heat conditioned gluten. Satisfactory acids include citric acid, acetic acid, formic acid, lactic acid, propionic acid, maleic acid and fumaric acid. A portion of the acid may be one or more mineral acids including phosphoric, sulfuric and hydrochloric acids. If desired, mixtures of the above named organic acids may be used. Other satisfactory organic acids which are somewhat less desirable than the above listed group include tartaric, gluconic, succinic, aconitic, malonic, adipic and malic acids. Of the above listed acids, the most desirable from all standpoints, are acetic, citric and propionic acids.

The degree of acidity of the reaction solution is important and satisfactory results are obtained when the solutions are relatively weakly acidic and operated at a pH in the range of about 3.0 to about 4.0. The best results are obtained when the pH is maintained in the range of 3.5–3.8 and the solutions should be 0.1 Normal solutions or weaker.

The acid is added in a quantity in excess of that necessary to effect the desired separation of gliadin from the glutenin and for illustrative purposes 150 grams dry gluten is satisfactorily reacted with 3 liters of a solution 0.025 N in acetic acid and 0.025 N in citric acid or 60 grams dry gluten is reacted with 1.2 liters of an aqueous solution 0.05 N in citric and 0.05 N in acetic acid. Other examples are set forth below. There is no known advantage to be gained from using quantities of acid greatly in excess of the above given typical proportions. It is important to the efficiency of the separation of gliadin from the glutenin fraction to initially establish and to maintain the temperature of the acidic reaction within the range of about 40° C. to about 80° C. When the temperature of the reacting mixture is below about 40° C. the acidic reaction fails to produce a reaction product from which a good separation of the gliadin from the glutenin can be obtained. While the upper temperature is not unusually critical, it is undesirable to exceed about 75° C. since such temperatures tend to devitalize the gliadin. An excellent operating temperature is about 57° C.

It is desirable to agitate the heat-conditioned gluten during the reacting period since in the absence of agitation the gluten may not be contacted uniformly with the acidic solution and an incomplete reaction may occur.

When the reaction proceeds in the temperature range of 40° C. to 80° C. and the gluten is subjected to mild agitation for a few minutes, for example, for 1-20 minutes and preferably 5-15 minutes, the liquid reaction solution continues to be clear and when the agitation is ceased the supernatant liquid is clear-opalescent. If, however, the agitation during reaction is violent, the glutenin disperses in the reaction solution making it turbid. This turbidity of the reaction solution can be observed during the reaction and for best results should be avoided. A satisfactory degree of agitation is that amount which mixes the gluten and reacting solution until the gluten is uniformly mixed into the solution without causing the reaction solution to become turbid, and for the purposes of the appended claims, the expression "mild agitation" is to be understod to have this meaning.

After the acidic reaction is completed, the gliadin can be separated from the glutenin in the reaction solution by centrifugation or filtering. Gliadin can be precipitated or separated from the gliadin-containing filtrate solution by adjusting the pH of the filtrate to above 5.0 by using ammonia, alkali or by salting out, for example, with sodium or lithium chloride, etc. When a pure gliadin is desired, it is preferred that the gliadin-containing filtrate solution be ultra-centrifuged to remove starch and fat which may be present prior to the gliadin precipitation step. After precipitation, the gliadin can be separated by filtering and dried in any conventional manner such as in air, or slightly warm air, vacuum dried, roll dried or if desired the gliadin may be redispersed in acetic acid or in phosphoric acid and spray dried by conventional spray drying techniques. When the gluten is heat conditioned in accordance with the above specified conditions it has been observed that the percentage of gliadin recovered, based on the total gliadin content, was increased by an average of about 12%-15% in comparison with the percentage of gliadin which is recovered when wet or non-heat conditioned gluten is used as the starting material. When the quantity of gliadin recovered by this process is compared with that recovered without the heat-conditioning treatment of the gluten, it will be seen that the increased recovery is well over 100%.

As indicated in Figure 1, the residue from the decantation step #3 is crude glutenin and the crude glutenin can be coagulated by adjusting the pH of the residue to within the range of 5.0 to 7.0 and then decanting the supernatant liquid. The coagulated glutenin is then reacted with an excess of an aqueous hydrochloric acid solution. The hydrochloric solution can satisfactorily have a strength of between 15% and 28% hydrochloric acid and is in excess when more than 0.4 of hydrochloric acid is added per pound of protein in the glutenin. This reaction mixture is then boiled at atmospheric pressure for about 8 to 24 hours to hydrolyze the protein to the various amino acids which are present in the coagulated glutenin material. The hydrolyzate from this reaction is then filtered to separate the humin from the solution, the humin being discarded. The filtrate containing the glutamic and other amino acids is then concentrated by evaporation to 23°–31° Baumé and additional hydrochloric acid is added to form glutamic acid hydrochloride. For this purpose a quantity of hydrochloric acid between 0 and about 0.3–0.4 pound hydrochloric acid per pound of protein which is present can be used to effect this reaction. Some glutamic acid hydrochloride forms without adding hydrochloric acid and by merely allowing the concentrated filtrate to cool, but in this case the efficiency is low and it is preferred to add about 0.3–0.4 pounds hydrochloric acid per pound of protein. The acidified solution is allowed to cool and is then filtered to separate the glutamic acid hydrochloride crystals from the other amino acids which remain in the filtrate. This filtrate is suitable for certain uses as is, or can be converted to other known final products as desired. The glutamic acid hydrochloride crystals are then dissolved in a minimum of water to effect the dissolution and if desired may be carbon filtered while hot to remove color bodies. It is not always necessary to remove the color bodies. In step #9 sufficient hydrochloric acid is added to the solution of glutamic acid hydrochloride crystals from step #7 to cause re-crystallization of those crystals. Re-crystallization can be accomplished without adding any hydrochloric acid but, as before, the efficiency of crystal formation is improved by adding quantities as great as 0.4 pound hydrochloric acid per pound of protein present. This reacidified solution is then filtered to separate the re-crystallized and purified glutamic acid hydrochloride crystals. These crystals are converted into a slurry by adding water and sufficient sodium hydroxide to raise the pH of the slurry to about 3.0. The sodium hydroxide converts the glutamic acid hydrochloride crystals into glutamic acid crystals which are then separated by filtration in step 11. The glutamic acid crystals from step 11 are converted into a solution by adding water, and sufficient sodium hydroxide is added to the solution to raise the pH to about 7.0, thus forming monosodium glutamate in solution. Monosodium glutamate crystals are separated by evaporating the monosodium glutamate solution until the monosodium glutamate crystals form and then filtering to separate those crystals.

The below given examples illustrate satisfactory operating conditions and demonstrate the increase in efficiency of gliadin separation which is obtained by the method of this invention. The examples further illustrate the complete process of producing both gliadin and monosodium glutamate.

EXAMPLE I

Spring wheat flour was washed and the wet gluten obtained therefrom was found to contain 70% water by weight. A large number of 200 gram batches of wet gluten containing 70% by weight moisture were fed onto the surface of a pair of rolls separated to produce a thin gluten sheet approximately 0.007" thick. The rolls were heated with steam at varying pressures producing roll surface temperatures between 95° C. and 105° C. and temperatures of the gluten separating from the roll in the range of about 70° C. to 75° C. The gluten fed to the roll surface remained in contact with the roll for approximately ⅓ to ⅔ of the roll circumference and for a relatively short period of time of, for example, from 1½ to 25 seconds depending upon the speed of the rolls and the initial moisture content. The time of contact was adjusted in conjunction with the roll temperature so that the temperature in the heat-conditioned gluten from the roll did not exceed 75° C. The particular rolls used had a diameter of 7.5" and roll speeds between 1 and 20 R. P. M. were employed to obtain varying degrees of moisture content in the heat conditioned gluten to demonstrate the above referred to moisture effect.

The batches of heat conditioned gluten as taken from the rolls were added to 1200 ml. of an 0.1 N citric acid solution. The solution was mildly agitated and maintained at 60° C. for approximately 10 minutes. The solution was then filtered hot to remove the glutenin and the filtrate was adjusted to a pH of 6.0 by the addition of sodium hydroxide with vigorous agitation to precipitate the gliadin. The gliadin was then separated by filtering and dried in air, and weighed to determine the quantity recovered.

The effect of roll speed, roll surface temperature and moisture content, is illustrated in Table I. These data clearly demonstrate the increased percentage of gliadin that is obtained from gluten which has been treated in accordance with the method of this invention in comparison with that recovered from conventional wet gluten which is subjected to the same process steps except that it is not heat conditioned. In all cases the temperature in the gluten coming from the rolls was in the range of 65° C.–75° C.

Table 1

| Batch | Gluten Wet wt., grams | Gluten Dry wt., grams | Gluten Moisture percent by wt. | Roll surface temp., °C. | Roll Steam pressure, p. s. i.-gauge | Roll Speed, R. P. M. | Gliadin recovered Gms. dry weight | Gliadin recovered Percent based on gluten, dry wt. |
|---|---|---|---|---|---|---|---|---|
| 1 (control) | 200 | | 70 | | 0 | 0 | 11.4 | 19 |
| 2 (control) | 200 | | 70 | | 0 | 0 | 9.3 | 15.5 |
| 3 (control) | 200 | | 70 | | 0 | 0 | 8.6 | 14.3 |
| 4 | 118 | 60 | 49.9 | 104.4 | 10 | 5 | 13.8 | 23.1 |
| 5 | 109 | 60 | 44.9 | 104.4 | 10 | 5 | 8.6 | 14.3 |
| 6 | 109 | 60 | 45 | 96.1 | 2.5 | 5 | 16.5 | 27.5 |
| 7 | 99 | 60 | 39.3 | 96.1 | 2.5 | 5 | 17.1 | 28.5 |
| 8 | 75.5 | 59 | 22.0 | 98.9 | 5 | 1 | 11.3 | 18.8 |
| 9 | 66.0 | 60 | 9.0 | 104.4 | 10 | 1 | 10.1 | 16.7 |
| 10 | 123 | 60 | 51.2 | 98.9 | 5 | 5 | 18.2 | 30.4 |
| 11 | 124.5 | 60.2 | 51.7 | 96.1 | 2.5 | 10 | 19.6 | 32.6 |
| 12 | 133 | 60 | 54.9 | 96.1 | 2.5 | 15 | 24.0 | 40.0 |
| 13 | 133.5 | 60.4 | 54.8 | 96.1 | 2.5 | 10 | 15.6 | 26.0 |
| 14 | 137.0 | 60 | 56.2 | 98.9 | 5 | 5 | 15.5 | 25.8 |
| 15 | 142.0 | 60 | 57.7 | 104.4 | 10 | 10 | 19.6 | 32.6 |
| 16 | 147 | 60 | 59.2 | 104.4 | 10 | 20 | 18.9 | 31.2 |
| 17 | 149 | 60.4 | 59.5 | 98.9 | 5 | 20 | 25.5 | 42.5 |
| 18 | 148.5 | 60 | 59.6 | 104.4 | 10 | 20 | 22.9 | 38.9 |
| 19 | 151.5 | 60.6 | 60.0 | 96.1 | 2.5 | 20 | 23.4 | 39.1 |
| 20 | 152.5 | 60 | 60.4 | 104.4 | 10 | 15 | 18.4 | 30.7 |
| 21 | 157.0 | 62.5 | 60.2 | 98.9 | 5 | 10 | 22.3 | 37.2 |
| 22 | 154.0 | 60.2 | 61.0 | 98.9 | 5 | 10 | 22.0 | 36.6 |
| 23 | 161 | 60.2 | 62.7 | 98.9 | 5 | 15 | 22.8 | 38.0 |
| 24 | 162 | 60 | 63.0 | 98.9 | 5 | 20 | 21.5 | 35.8 |
| 25 | 163 | 60.2 | 63.2 | 98.9 | 5 | 20 | 22.6 | 37.6 |
| 26 | 166 | 60.1 | 63.8 | 96.1 | 2.5 | 15 | 21.5 | 35.8 |
| 27 | 164 | 9 | 64.0 | 98.9 | 5 | 15 | 18.4 | 30.6 |

From the data in Table I it may be seen that the proportion of gliadin which is obtained from wet gluten averages about 16.4% based on the dry gluten in the starting material. When the heat conditioning temperature in the gluten being dried is maintained between 70° C. and 75° C. a slight improvement is obtained in the proportion of gliadin recovered even when the moisture removed from the gluten has been reduced to 9% (see columns 2 to 5). When the moisture content remaining in the heat conditioned gluten is above about 50% a very substantial increase in the proportion of gliadin recovered is obtained. Generally speaking, somewhat better gliadin recoveries were obtained when the roll speed was between 10 and 20 R. P. M. with the best results occurring at roll speeds of 20. Under the preferred conditions it will be apparent that the gliadin recovery is more than doubled relative to that which is obtained from gluten which has not been preliminarily heat conditioned prior to reaction.

EXAMPLE II 1260 grams of wet gluten containing 70% moisture by weight was heat conditioned by passing the same through the rolls described in Example I at a speed of 5 R. P. M. and a steam pressure of 5 p. s. i. to produce 378.3 grams of heat conditioned gluten, dry weight. This material was then added to a 0.1 N citric acid solution and mildly agitated therein at 60° C. for approximately 10 minutes. The solution was then filtered while hot, the filtrate being adjusted to a pH of 6.0 by the addition of sodium hydroxide and the resultant gliadin precipitate filtered and dried. The weight of the dry gliadin so obtained was 94.6 grams. The glutenin obtained from this filtration was 227 grams which contains 150 grams protein, dry basis. This glutenin was then used as the raw material in the monosodium glutamate process and subjected to steps 4–13 in order and under the conditions shown in Figure 1 for those steps.

A comparable quantity of protein, namely 150 grams dry, in the form of gluten which had been dried at temperatures of 90–100° C. was processed through steps 4–13 of the mono-sodium glutamate process and under the conditions shown in Figure 1 for the purpose of providing a comparison with the glutenin resulting from the gliadin separation step #3 of this process. The glutenin yielded 53.9 grams of monosodium glutamate while the dried gluten yielded 57.8 grams of monosodium glutamate. While the dry gluten produces a slightly larger quantity of mono-sodium glutamate, it produces no gliadin and it is apparent that the glutenin is a satisfactory starting material for making monosodium glutamate. Moreover, the process of this invention represents an over-all improvement relative to the use of high temperature dried gluten because of the high proportion of valuable gliadin which is also recovered from the gluten starting material.

What is claimed is:

1. A method for treating gluten containing gliadin and glutenin which comprises the steps of (1) heating wet gluten containing at least about 65% water by weight to an elevated temperature not exceeding about 75° C. for a time sufficient to reduce the water content of said gluten to a minimum of about 50% by weight, (2) reacting the gluten from step #1 with an aqueous acidic solution having a pH of about 3.0 to about 4.0 at a temperature between about 40° C. and 80° C. for 1 to 20 minutes while mildly agitating the same to form a reaction solution, and (3) separating the glutenin and gliadin from said reaction solution.

2. A method comprising the steps of (1) heating gluten containing at least about 65% water by weight at a temperature of about 65° C. to 75° C. for a time sufficient to reduce the water content of said gluten to a minimum of about 50% by weight, (2) reacting the gluten from step #1 with an aqueous acidic solution having a pH of about 3.0 to about 4.0 at a temperature between about 40° C. and 80° C. for 1 to 20 minutes while mildly agitating the same, and (3) separating the glutenin and gliadin from said reaction solution.

3. A method of treating gluten which comprises the steps of (1) heating gluten containing at least about 70% water by weight at a temperature not exceeding about 75° C. until the water content is in the range of about 60% to 63% by weight, (2) reacting the gluten from step 1 with an aqueous acidic solution having a pH of about 3.0 to about 4.0 at a temperature between about 40° C. and 80° C. for 5 to 15 minutes while mildly agitating the same to cause a separation of gliadin and glutenin in said solution, (3) separating the glutenin from the said reaction solution, and (4) adjusting the pH of the filtrate from step #3 to above about 5.0 and separating the gliadin therefrom.

4. A method for treating gluten containing gliadin and glutenin to produce gliadin and monosodium glutamate which comprises the steps of (1) heating gluten containing at least about 70% water by weight at a temperature not exceeding about 75° C. until the water content of said gluten is reduced to a minimum of about 50% by weight, (2) reacting the gluten from step #1 with an aqueous acidic solution having a pH of about 3.0 to about 4.0 at a temperature between about 40° C. and 80° C. for 5 to 15 minutes while mildly agitating the same to cause a separation of gliadin and glutenin in said solution, (3) separating the glutenin from the said reaction solution and (4) converting the glutenin from step #3 into monosodium glutamate.

5. A method in accordance with claim 1 wherein said wet gluten is positioned on a rotatable roll having a surface temperature in the range of 95° C. and 105° C. and passed between said roll and another roll positioned so as to form a thin sheet of said gluten, the contact time between said gluten and said roll being in the range of about 1½ seconds and 25 seconds.

6. In a method for treating gluten containing gliadin and glutenin to produce gliadin and monosodium glutamate which includes the steps of (1) reacting the gluten with an aqueous acidic solution to cause a separation of gliadin and glutenin in said solution, (2) separating the glutenin from the said reaction solution, (3) reacting the said glutenin with an excess of 15-28% hydrochloric acid by boiling at atmospheric pressure for 8-24 hours, (4) filtering the hydrolyzate from step #3 to remove the humin therefrom, (5) evaporating the filtrate from step #4 to 23°-31° Bé. and adding about 0.3-0.4 pound of hydrochloric acid per pound of protein and allowing the mixture to cool, (6) filtering the slurry from step #5, (7) dissolving the crystals from the filtration of step #6 in a minimum of water and heating the same, (8) allowing the heated solution of step #7 to cool to thereby recrystallize glutamic acid hydrolyzate, (9) adding sodium hydroxide and water to the recrystallized glutamic acid hydrochloride to raise the pH to about 3.0, (10) filtering the slurry from step #9 to separate the crystals therefrom, (11) adding water and sodium hydroxide to the crystals of step #10 to raise the pH to about 7.0, and (12) thereafter evaporating excess water from the solution of step #11 to crystallize monosodium glutamate therefrom: the improvement which comprises employing gluten having at least about 70% water by weight and preheating said gluten prior to the acid treating step (1) above at a temperature not exceeding about 75° C. for a time sufficient to reduce the water content of said gluten to a minimum of about 50% by weight, in the acid treating step (1) above, the pH of the aqueous acid solution being about 3.0 to 4.0 and the acid treating reaction mixture being heated at a temperature between about 40° C. and 80° C. for 1 to 20 minutes while mildly agitating same.

References Cited in the file of this patent

Anson, M. L.: Advances in Protein Chemistry, vol. 2, Academic Press, New York (1945), pages 345 and 349.

Bjorksten, John: Chem. Industries, vol. XLVIII, June 1941, pages 746-751.

Isgareischew, N., et al.: Kolloid Zeitschrift, vol. 38, 1926, pages 238-242.

Sagi, Eugene S.: Trans. Amer. Assoc. of Cereal Chemistry, vol. 12 (1954), pages 56-59.

Senti, F. R.: Communications to the Editor, J. Am. Chem. Soc., December 1943, page 2473.

UNITED STATES PATENT OFFICE
CERTIFICATE OF CORRECTION

Patent No. 2,861,062                                          November 18, 1958

Eric A. Borel et al.

It is hereby certified that error appears in the printed specification of the above numbered patent requiring correction and that the said Letters Patent should read as corrected below.

Column 3, line 23, for "When" read -- Where --; columns 5 and 6, Table 1, under the heading "Gluten", and subheading "Dry wt., grams", last line thereof, for "9" read -- 59 --.

Signed and sealed this 10th day of February 1959.

(SEAL)
Attest:

KARL H. AXLINE                                          ROBERT C. WATSON
Attesting Officer                                       Commissioner of Patents